(12) United States Patent
Paternoster et al.

(10) Patent No.: US 11,173,658 B2
(45) Date of Patent: Nov. 16, 2021

(54) RECOATING UNIT AND DEVICE FOR PRODUCING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 362 days.

(21) Appl. No.: 15/772,583

(22) PCT Filed: Nov. 10, 2016

(86) PCT No.: PCT/EP2016/001876
§ 371 (c)(1),
(2) Date: May 1, 2018

(87) PCT Pub. No.: WO2017/080660
PCT Pub. Date: May 18, 2017

(65) Prior Publication Data
US 2019/0091921 A1    Mar. 28, 2019

(30) Foreign Application Priority Data

Nov. 10, 2015  (DE) .......................... 102015222100.8

(51) Int. Cl.
*B29C 64/153*    (2017.01)
*B33Y 30/00*    (2015.01)
(Continued)

(52) U.S. Cl.
CPC ............ *B29C 64/153* (2017.08); *B22F 3/004* (2013.01); *B22F 12/00* (2021.01); *B29C 41/12* (2013.01);
(Continued)

(58) Field of Classification Search
CPC ... B29C 64/205; B29C 64/209; B29C 64/214; B29C 64/218; B22F 3/1055; B01J 2/00; B28B 1/001
See application file for complete search history.

(56) References Cited

U.S. PATENT DOCUMENTS 3,477,570 A  * 11/1969 Petersen .................. B07B 7/08
                                                               209/711
5,462,596 A    10/1995 Arnaud et al.
(Continued)

FOREIGN PATENT DOCUMENTS

DE          19928245          1/2001
DE          10105504          8/2002
(Continued)

OTHER PUBLICATIONS

International Search Report for Application No. PCT/EP2016/001876 dated Mar. 6, 2017, 3 pages.

*Primary Examiner* — Xiao S Zhao
*Assistant Examiner* — Nicholas J Chidiac
(74) *Attorney, Agent, or Firm* — Seyfarth Shaw LLP

(57) ABSTRACT

A recoating unit for equipping and/or retrofitting a device for producing a three-dimensional object by means of selectively solidifying, layer by layer, of a building material in powder form. The recoating unit is configured, depending on its movement in the first direction or in its opposite direction, to receive building material in that chamber that is the trailing chamber in the respective direction of movement and to spread the building material received in the respective
(Continued)

trailing chamber to a uniform layer by means of the respective trailing recoating element.

9 Claims, 3 Drawing Sheets

(51) Int. Cl.
*B33Y 40/00* (2020.01)
*B29C 64/205* (2017.01)
*B22F 12/00* (2021.01)
*B22F 3/00* (2021.01)
*B29C 41/12* (2006.01)
*B29C 41/36* (2006.01)
*B33Y 10/00* (2015.01)
*B22F 10/10* (2021.01)

(52) U.S. Cl.
CPC ............ *B29C 41/36* (2013.01); *B29C 64/205* (2017.08); *B33Y 30/00* (2014.12); *B33Y 40/00* (2014.12); *B22F 10/10* (2021.01); *B22F 2999/00* (2013.01); *B33Y 10/00* (2014.12); *Y02P 10/25* (2015.11)

(56) References Cited

U.S. PATENT DOCUMENTS

| | | | |
|---|---|---|---|
| 6,672,343 B1 | 1/2004 | Perret et al. | |
| 10,434,710 B2* | 10/2019 | Todorov | B29C 64/165 |
| 2005/0074550 A1 | 4/2005 | Leuterer et al. | |
| 2009/0068376 A1 | 3/2009 | Philippi et al. | |
| 2015/0367415 A1* | 12/2015 | Buller | B33Y 50/02 |
| | | | 419/53 |
| 2017/0072614 A1* | 3/2017 | Lind | B29C 64/118 |
| 2017/0334024 A1* | 11/2017 | Buller | B33Y 30/00 |
| 2018/0354190 A1* | 12/2018 | Todorov | B22C 9/02 |

FOREIGN PATENT DOCUMENTS

| | | |
|---|---|---|
| DE | 102005022308 | 11/2006 |
| EP | 0612566 | 8/1994 |
| EP | 2191922 | 6/2010 |
| EP | 2859973 | 4/2015 |

* cited by examiner

RECOATING UNIT AND DEVICE FOR PRODUCING A THREE-DIMENSIONAL OBJECT

TECHNICAL FIELD OF THE INVENTION

The present invention relates to a method and a device for producing a three-dimensional object by means of applying, layer by layer, and selectively solidifying a building material in powder form, in particular to a recoating unit comprised by the device and used for the method.

BACKGROUND OF THE INVENTION

Devices and methods of this type are used, for example, in rapid prototyping, rapid tooling or additive manufacturing. An example of such a method is known by the name "selective laser sintering or laser melting." In this method, a thin layer of a building material in powder form is repeatedly applied and the building material is selectively solidified in each layer by selective irradiation with a laser beam.

DE 10 2005 022 308 A1 describes a laser sintering device, in which the building material in powder form is applied by means of a recoater that can be moved back and forth across a build area, which recoater has the form of a double blade consisting of two rigid blades. The recoater is first filled from a storage container with an amount of building material that is sufficient to apply a layer and then moves across the build area, wherein the powder received in it is spread out to a thin powder layer. The recoater further comprises a recoater heater in the form of heating wires provided in the recoater blades and a fluidization device integrated into the recoater with which the material in powder form can be preheated and fluidized immediately before application.

During the movement of the recoater the fill level of the powder received in it decreases due to applying the powder layer. This also reduces the static pressure at the bottom of the recoater, which can result in an alteration of the application conditions of the powder and thus in a reduction in the homogeneity of the applied powder layer and thus in a reduction of the quality of the object produced.

SUMMARY OF THE INVENTION

It is an object of the present invention to provide an alternative or improved device or an alternative or improved method for producing a three-dimensional object by layer-wise applying and selectively solidifying a building material in powder form.

The object is achieved by a recoating unit according to claim 1, a recoater according to claim 5, a device according to claim 8 and a method according to claim 9. Further developments of the invention are given in the respective dependent claims. The method can also be further developed by the features of the devices, which features are given below or in the dependent claims, or vice versa, and a device can also be further developed by the features of another device.

The recoating unit according to the invention serves for equipping and/or retrofitting a device for producing a three-dimensional object by means of selectively solidifying, layer by layer, of a building material in powder form, wherein the device comprises a recoater that can be moved across a build area for applying a layer of the building material to the build area and a solidification device for selectively solidifying the applied layer at positions that correspond to a cross-section of the object to be produced and which device is configured and/or controlled to repeat the steps of applying and selectively solidifying until the object is completed. The recoating unit comprises two recoating blades spaced apart from each other in a first direction and extending in a direction transverse to the first direction, which recoating blades confine a receiving space for the building material in powder form in the first direction and in its opposite direction, and a partition wall that is arranged between the two recoating blades and at a distance to the two recoating blades with respect to the first direction and which partition wall extends in a direction transverse to the first direction, thus dividing the receiving space for the building material into two chambers. Depending on its movement in the first direction or in its opposite direction, the recoating unit is adapted to receive building material in that chamber that is the trailing chamber in the respective direction of movement and to spread the building material received in the respective trailing chamber to a uniform layer by means of the respective trailing blade. By means of this recoating unit it is achieved, for example, that the homogeneity and uniformity of the applied powder layer can be improved and that it can be ensured that at all locations sufficient powder is available for recoating.

Preferably, a fluidization device is arranged in and/or at at least one of the recoating blades and/or the partition wall, which fluidization device is suited to fluidize the building material received in one of the two chambers. As a result, the building material in powder form becomes more mobile and can, for example, be applied with greater process stability, e.g. with reduced shear rate, and can flow better in a direction transverse to the application direction to locations where more powder is required.

Preferably, the recoating unit comprises a guide plate pivotably arranged preferably at the partition wall for guiding supplied building material into one of the two chambers. This allows, for example, for easy redirection of powder depending on the application direction.

Preferably, the recoating unit comprises a shaft with eccentric, wherein the shaft is arranged so that the guide plate can be pivoted by rotating the shaft. As a result, for example, the guide plate can be simply moved from one position to another.

The recoater according to the invention serves for equipping and/or retrofitting a device for producing a three dimensional object by means of selectively solidifying, layer by layer, of a building material in powder form, wherein the device is adapted to receive the recoater so that it can be moved across a build area for applying a layer of the building material to the build area, wherein the device comprises a solidification device for selectively solidifying the applied layer at positions that correspond to a cross-section of the object to be produced and which device is configured and/or controlled to repeat the steps of applying and selectively solidifying until the object is completed. The recoater comprises a recoating unit according to the invention. As a result, for example, the effects given above for the recoating unit can be achieved with a recoater that comprises the recoating unit fixedly or as an exchangeable module.

Preferably, the recoater further comprises a powder discharge unit that is preferably implemented to be movable together with the recoating unit. As a result, for example, powder can be metered into the recoating unit of the recoater.

Preferably, the recoater further comprises a guide plate that is pivotably arranged, preferably at the partition wall of the recoating unit, for guiding supplied building material into one of the two chambers of the recoating unit and a shaft with eccentric, which shaft is arranged so that the guide plate can be pivoted by rotating the shaft, wherein the shaft with eccentric is at least partially coupled in its movement with a movement of a metering device, such as a metering shaft, of the powder discharge unit. In addition to the effects given above for the guide plate and the shaft with eccentric, the number of separate drives for operating the recoater can be reduced, for example.

The device according to the invention serves for producing a three dimensional object by means of selectively solidifying, layer by layer, of a building material in powder form and comprises a recoater that can be moved across a build area in a first direction and/or its opposite direction for applying a layer of the building material to the build area and a solidification device for selectively solidifying the applied layer at positions that correspond to a cross-section of the object to be produced. The device is configured and/or controlled to repeat the steps of applying and selectively solidifying until the object is completed. The recoater comprised in the device comprises a recoating unit as described above and/or is configured as a recoater as described above. As a result, for example, the effects given above for the recoating unit and the recoater can also be achieved for a device for producing a three-dimensional object that comprises the recoating unit and/or the recoater.

The method according to the invention serves for producing a three dimensional object by means of layer-wise applying and selectively solidifying a building material in powder form. The method comprises the steps of applying a layer of the building material in powder form to a build area by means of a recoater that moves across the build area in a first direction and/or its opposite direction, selectively solidifying the applied powder layer at positions that correspond to a cross-section of the object to be produced and repeating the steps of applying and selectively solidifying until the object is completed. The application step is implemented with the aid of a recoating unit comprised by the recoater, which recoating unit comprises two recoating blades spaced apart from each other in the first direction and extending in a direction transverse to the first direction, which recoating blades confine a receiving space for the building material in powder form in the first direction and in its opposite direction, and a partition wall that is arranged between the two recoating blades and at a distance to the two recoating blades with respect to the first direction and which partition wall extends in a direction transverse to the first direction, thus dividing the receiving space for the building material into two chambers. Depending on the movement of the recoater either in the first direction or in its opposite direction, the recoating unit receives building material in that chamber that is the trailing chamber in the respective direction of movement and spreads the building material received in the respective trailing chamber to a uniform layer by means of the respective trailing blade. In this way, for example, the effects given above for the recoating unit can be achieved in a method for producing a three-dimensional object.

Preferably, the building material received in the respective trailing chamber is fluidized while the recoater moves. As a result, the building material in powder form becomes more mobile and can, for example, be applied with greater process stability and can flow better in a direction transverse to the application direction to locations where more powder is required.

Preferably, building material in powder form is supplied continuously or at intervals from a powder discharge module to the recoating unit during its movement across the build area, which powder discharge module moves across the build area together with or separate from the recoating unit. As a result, for example, powder can be metered into the recoating unit of the recoater.

Preferably, the building material in powder form is metered by the moving powder discharge module in such a way that a powder level in the respective trailing chamber remains approximately constant. By doing so, for example, the pressure at the bottom of the powder can be kept approximately constant and furthermore the quality, in particular the homogeneity, of the applied layer can be improved.

Preferably, a bottom side of the partition wall of the recoating unit is located at a lower level than at least one of the bottom sides of the two recoating elements. This prevents, for example, powder from flowing out in front of the partition wall.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
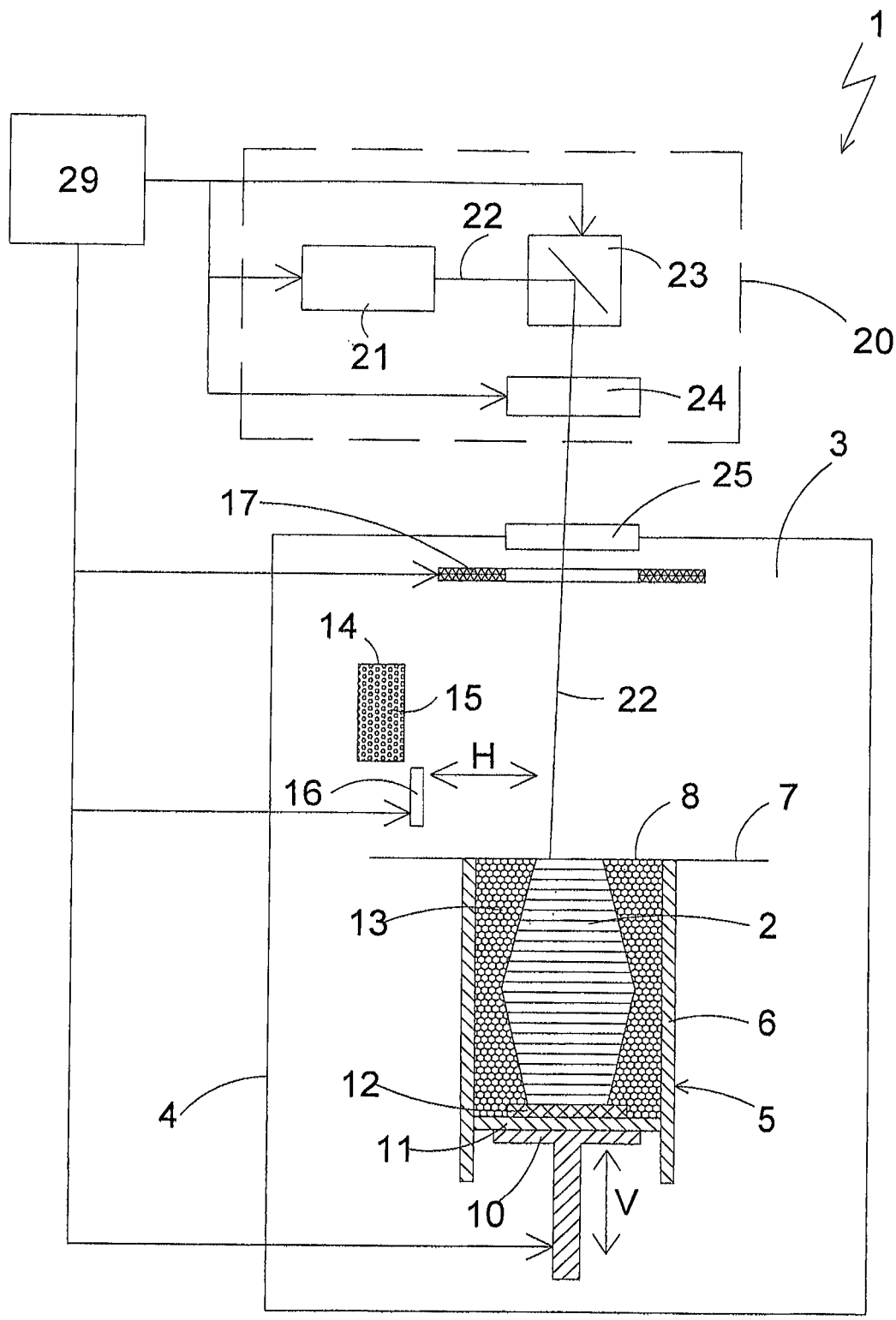
FIG. 1 shows a schematic view, partially in cross-section, of a device for producing a three-dimensional object layer by layer according to an embodiment of the present invention.

Hereafter, a device 1 according to an embodiment of the present invention is described with reference to FIGS. 1 to 3. The device shown in FIG. 1 is a laser sintering device or laser melting device 1. For building an object 2, it comprises a process chamber 3 with a chamber wall 4.

A container 5 open to the top with a container wall 6 is arranged in the process chamber 3. A working plane 7 is defined by the upper opening of the container 5, wherein the area of the working plane 7 located within the opening, which can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10 which plate is fixed to the support 10, or it can be integrally formed with the support 10. Depending on the powder and process used, a building platform 12 can also be arranged on the base plate 11 on which the object 2 is built. However, the object 2 can also be built on the base plate 11 itself, which then serves as a building platform. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises a storage container 14 for a building material in powder form 15 that can be solidified by electromagnetic radiation and a recoater 16 that can be moved in a horizontal direction H for applying building material 15 to the build area 8. Furthermore, a radiant heater 17 is arranged in the process chamber for preheating the building material 15 applied to the build area 8. The radiant heater 17 is designed as an infrared heater, for example.

The laser sintering device 1 further comprises an irradiation device 20 with a laser 21 which produces a laser beam 22 which is deflected by a deflection device 23 and focused upon the working plane 7 by way of a focusing device 24 through a coupling window 25 that is arranged on the upper side of the processing chamber 3 in the chamber wall 4.

Furthermore, the laser sintering device 1 comprises a control unit 29 by which the individual components of the device 1 can be controlled in a coordinated manner in order to implement the building process. The control unit can also be arranged partially or completely outside the device. The control unit can comprise a CPU, the operation of which is controlled by a computer program (software). The computer program can be stored separately from the device on a storage medium from which it can be loaded into the device, in particular into the control unit 29.

During operation, for applying a powder layer, the support 10 is first lowered by an amount that corresponds to the desired thickness of the layer. Then a layer of building material in powder form 15 is applied by moving the recoater 16 across the working plane 7. Application takes place at least over the entire cross-section of the object 2 to be produced, preferably over the entire build area 8, i.e. that region of the working plane 7 that can be lowered by a vertical movement of the support. The building material in powder form is then preheated by the radiant heater 17. When a working temperature is reached, the cross-section of the object 2 to be produced is scanned by the laser beam 22 so that the building material in powder form 15 is solidified at those positions that correspond to the cross-section of the object 2 to be produced. These steps are repeated until the object 2 is completed and can be removed from the building space.

Figure 2:
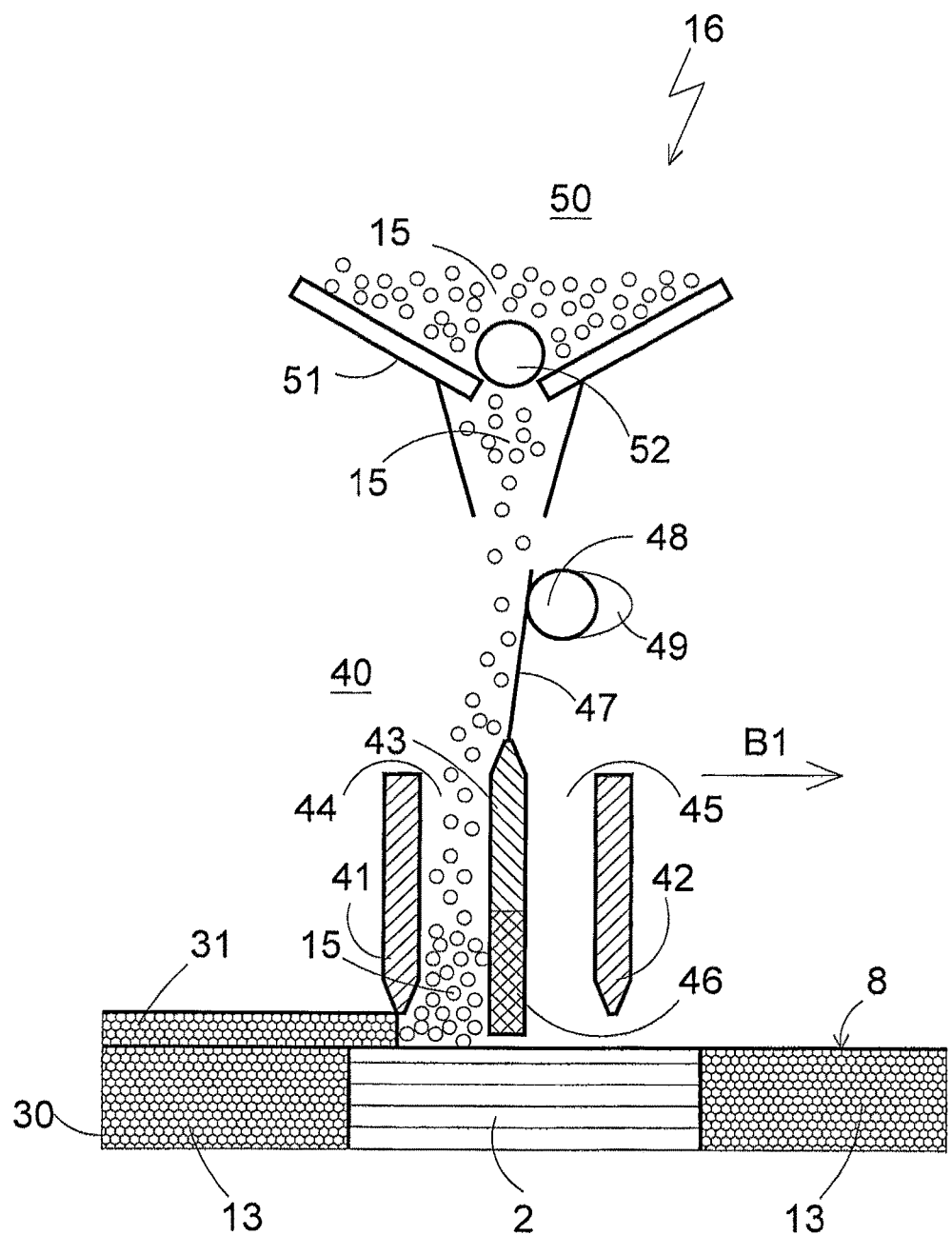
FIG. 2 shows an enlarged view, partially in cross-section, of a part of the device shown in FIG. 1 and shows, among other things, a recoater moving in a first direction across a build area.

FIG. 2 shows a view, partially in cross-section and not to scale, of an area within the process chamber 3 of the device shown in FIG. 1. FIG. 2 in particular shows the recoater 16 during its movement in a first application direction B1 across the build area 8.

In a powder bed 30 formed by previous process steps, the solidified part of the object 2 to be produced is surrounded by powder 13 that remained unsolidified. A further powder layer 31 of the building material 15 is now applied upon the previously applied and selectively solidified powder layer by means of a movement of the recoater 16 in the first application direction B1.

For that purpose, the recoater comprises a recoating unit 40 and a powder discharge unit 50.

The recoating unit 40 comprises a first blade 41 and a second blade 42 that are spaced apart from each other in the first application direction B1. Said two blades 41, 42 at least partially confine an intermediate space in the first application direction B1 and in its opposite direction. Said intermediate space confined by the two blades 41, 42 is configured to receive a supply of building material in powder form 15. A partition wall 43 is arranged between the two blades 41, 42 and spaced apart from the blades with respect to the first application direction B1, which partition wall divides the intermediate space in the first application direction B1 into a first chamber 44 and a second chamber 45. Transverse, preferably perpendicular to the application direction B, the two blades 41, 42 and thus also the intermediate space confined by them extend across the entire width of the area to be recoated, preferably across the entire build area 8.

A fluidization device 46 is arranged in and/or at the partition wall 43 by means of which building material can be fluidized in the two chambers 44, 45. In doing so, a gas is introduced into the respective chamber and produces a fluidized bed of the building material in powder form, that is, the gas puts the building material in a fluidized bed-like condition. Preferably, the gas is preheated.

A guide plate 47 is pivotably arranged above the partition wall 43 in such a way that it guides building material supplied from the powder discharge unit 50 to the recoating unit 40 into one of the two chambers 44, 45. The guide plate 47 is preferably pivotably arranged at the partition wall.

Furthermore, a shaft 48 with eccentric 49 is arranged in the recoater 16 so that by the rotation of the shaft, the guide plate 47 can be pivoted between the two positions in which it guides the building material into the first chamber 44 or into the second chamber 45.

The powder discharge unit 50 comprises a powder receiving container 51 that is funnel-shaped in its cross-section in the present embodiment and that is adapted to receive a predetermined quantity of building material in powder form 15, and a metering device 52, for example in the form of a metering shaft, by means of which building material in powder form can be supplied to the recoating unit 40 in a metered way. Preferably, the powder discharge unit 50 comprises a local radiant heater (not shown in the figure) for preheating the building material 15 and/or a fluidizing device (not shown in the figure) for fluidizing the building material 15.

The powder discharge unit 50 and the recoating unit 40 are preferably arranged so as to be movable together across the working plane, however, the powder discharge unit 50 can also be movable separately from the recoating unit 40.

For applying the new powder layer 31, the recoater 16 or at least the powder discharge unit 50 first moves to the storage container 14 and receives a predetermined amount building material in powder form 15 into the container 51. This predetermined amount of powder is preferably at least as great as, more preferably greater than the amount of powder required to apply a layer 31 of the building material in powder form 15.

Preferably, the powder 15 received in the container 51 is preheated by means of the local radiation heater and/or fluidized by introducing a preferably heated gas.

Then, the powder discharge unit 50 moves together with the recoating unit 40 in the first recoating direction B1 across the build area 8 and, while doing so, dispenses powder 15 by means of the metering device 52 to the recoating unit 40 moving across the build area 8 in the first application direction. This dispensing of powder can be continuous or at intervals. When dispensed at intervals, the powder discharge unit 50 does not need to be moved together with the recoating unit 40 but only has to be located at the position of the recoating unit 40 at those points in time when powder is dispensed.

The building material dispensed from the powder discharge unit 50 falls down by its own weight and hits the guide plate 47 shown in its rest position in FIG. 2. The powder slides into the first chamber 44 via the guide plate 47, which first chamber 44 is the trailing chamber in the first direction of movement B1. The building material is fluidized in the first chamber 44 and spread to a uniform powder layer 31 by the first blade 41 that is the trailing blade in the first direction of movement B1.

The building material in powder form is preferably metered by the powder discharge module in such a way that a powder level in the first chamber 44 remains approximately constant. As a result, the pressure of the powder column 15 acting on the powder bed 30 also remains approximately constant, which leads to more uniform application conditions and thus to a better homogeneity and quality of the applied powder layer 31.

A further improvement in the quality of the applied powder layer 31 is achieved by preventing powder from flowing out in front of the second blade 42 that is located in front in the first application direction B1. In a recoating unit without a partition wall, the powder fills the entire area between the two blades. Since the bottom of both blades is located at the same height, the blade located ahead in the application direction has a distance from the powder bed which corresponds to the thickness of the applied powder layer. Thus, it is easily possible that a portion of the powder that is highly mobile due to fluidization escapes in front of the front blade. This powder would then be compressed by both blades when the recoater passes over, which can result in undesirable effects.

However, in the present recoating unit with partition wall, the powder does not reach the front blade at all and therefore cannot flow out. In addition, the bottom of the partition wall 43, which never moves across the recently applied powder layer 31 irrespective of the application direction, can be located at a lower level than the bottom of the two blades 41, 42. As a result, powder is effectively prevented from flowing out in front of the partition wall 43, too. At a high recoating speed, also the force of inertia of the powder 15 received in the first chamber 44 counteracts the outflow in front of the partition wall.

When solidifying building material in powder form 15 by means of radiation 22, often a reduction in volume is obtained so that slight depressions occur at the surface of the powder bed at the solidified locations. More building material is then required at these locations than at other locations when applying the next powder layer. However, by fluidizing the building material 15 in the first chamber 44, the building material 15 can flow in a direction transverse to the application direction to regions where more powder is required without a powder deficiency occurring there.

Figure 3:
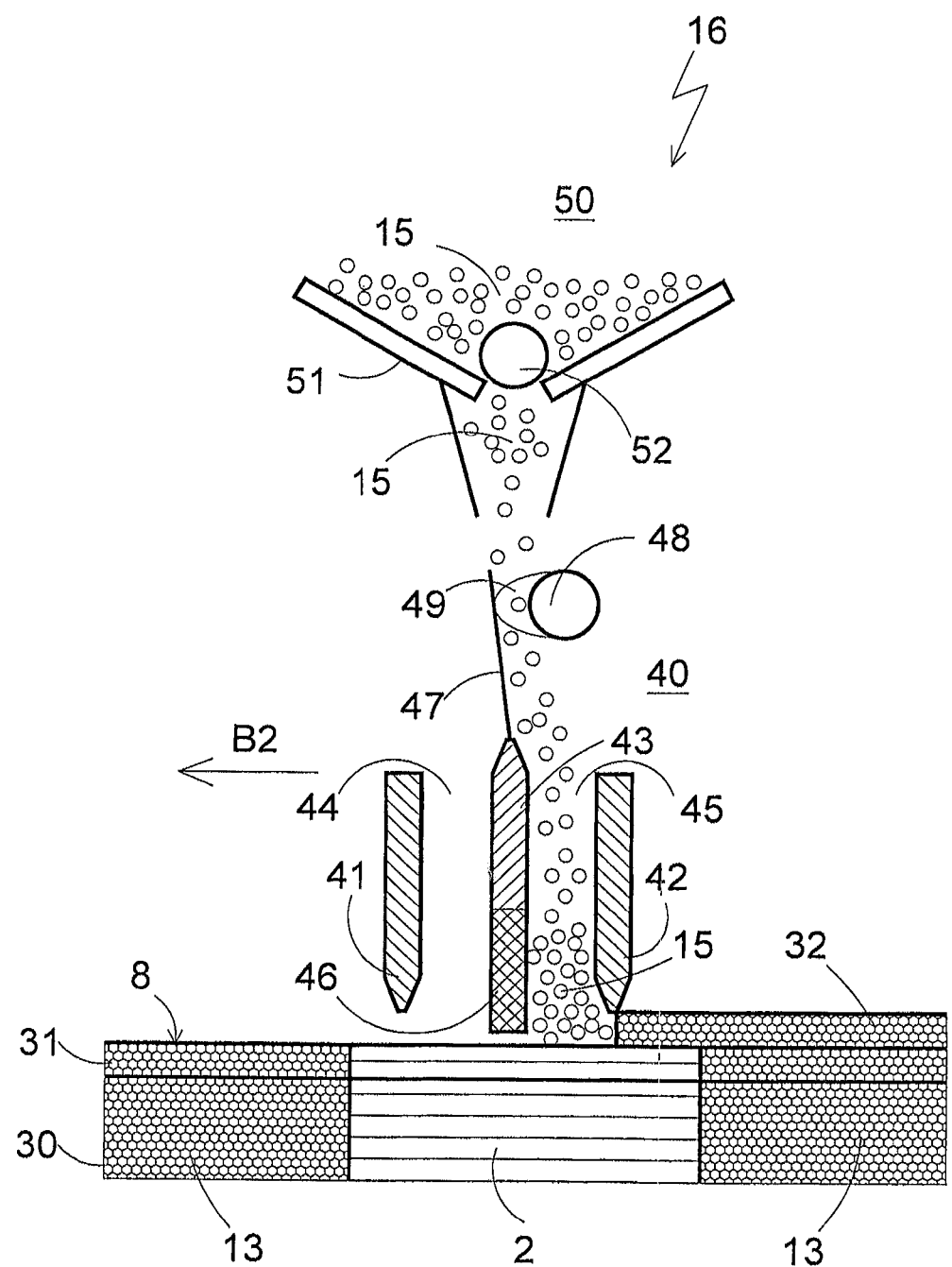
FIG. 3 shows an enlarged view, partially in cross-section, of a part of the device shown in FIG. 1 and shows, among other things, the recoater moving in a second direction across the build area.

FIG. 3 shows a schematic view, not to scale and partially in cross-section, of an area within the process chamber 3 of the device 1 shown in FIG. 1. In particular, FIG. 3 shows the recoater 16 during its movement in a second application direction B2 across the build area 8, which second application direction is opposite to the first application direction B1.

The term "opposite" does not necessarily imply an angle of 180° when viewing the working plane from above, but only that the second application direction B2 has a component pointing in the opposite direction of the first application direction B1. Preferably, the angle between the first and second application directions is between 15 and 210 degrees, particularly preferred 180°.

A further powder layer 32 is now applied in the second direction of movement B2 on the first selectively solidified powder layer 31. This is substantially implemented in the same way as in the case of the first powder layer 31 so that only the differences are described here.

First, the recoater 16 or at least the powder discharge unit 50 moves to a storage container that is not shown in FIG. 1 and is located at the side of the build area 8 opposite to the storage container 14 and receives a predetermined amount building material in powder form 15 into the container 51. Alternatively, before applying the powder layer 31, the powder discharge unit 50 can also receive an amount of powder sufficient for the two powder layers 31, 32

Then, the powder discharge unit 50 again dispenses powder 15 continuously or at intervals by means of the metering device 42 to the recoating unit 40 moving across the build area 8 in the second application direction B2.

When the recoating unit moves in the second application direction B2, the guide plate 47 is brought to a position via the eccentric 49 arranged at the shaft 48 by means of a rotation of the shaft 48, in which position the powder hitting the guide plate 47 is guided into the second chamber 45 being the trailing chamber in the second direction of movement B2. The building material is fluidized in the second chamber 45 and spread to a uniform powder layer 32 by the second blade 42 that is the trailing blade in the second direction of movement B2.

Depending on the application direction, the building material dispensed by the powder discharge unit 50 is thus always received in the trailing chamber and spread to a uniform layer by the trailing blade.

When the recoater moves again in the first application direction for applying the next powder layer, the shaft 48 is again rotated to the position shown in FIG. 2 and the guide plate 47 returns to its original position by means of a return unit (not shown in the figures), such as a spring, or by means of a guiding device by the eccentric 49.

So as not to require a separate drive for rotating the shaft 48, the shaft 48 can be at least partially coupled in its movement with a movement of the metering device 52 of the powder discharge unit 50, e.g. a metering shaft.

In the embodiment described above, the recoating unit forms an integral part of the recoater. However, the recoating unit can also be designed as a recoating module separate from the recoater, which recoating module is adapted to be attached to the recoater to be movable with the recoater so that the direction in which the blades and the partition wall are spaced apart from each other coincides with the direction in which the recoater can be moved across the working plane.

The fluidizing device of the recoating unit can alternatively or in addition to the partition wall also be arranged in or at one of the blades or both blades.

Instead of blades, it is also possible to use other recoating elements for applying a layer of the building material, for example those having a roller at their bottom side.

Even though the present invention was described with regard to a laser sintering or laser melting device, it is not limited to laser sintering or laser melting. It can be applied to any methods for producing a three-dimensional object by layer-wise applying and selectively solidifying a building material.

The irradiation device can comprise, for example, a gas or solid state laser or any other kind of laser, such as laser diodes, in particular VCSEL (Vertical Cavity Surface Emitting Laser) or VECSEL (Vertical External Cavity Surface Emitting Laser) or an array of these lasers. In general, any device can be used as an irradiation device with which energy in the form of wave radiation or particle radiation can be applied selectively to a layer of building material. Instead of a laser, for example, a different light source, an electron beam or any other source of energy or radiation can be used which is suited for solidifying the building material. Instead of deflecting a beam, irradiation can also be implemented by means of a movable array irradiation device. The invention can also be applied to selective mask sintering, in which an extended light source and are mask are used, or the invention can be applied to high speed sintering (HSS), in which a material is selectively applied to the building material that increases or reduces the absorption of radiation at those positions that correspond to the object cross-section and then irradiated unselectively and in a large area or by means of a movable array irradiation device (absorption sintering or inhibition sintering).

Instead of introducing energy, the building material applied can also be selectively solidified by 3D printing, for example by applying an adhesive. In general, the invention is directed to the production of an object by means of layer-wise applying and selectively solidifying a building material, regardless of the manner in which the building material is solidified.

Various powders can be used as a building material, in particular metal powders, plastic powders, ceramic powders, sand, filled or mixed powders.

The invention claimed is:

1. A recoating unit for equipping and/or retrofitting a device for producing a three-dimensional object by selectively solidifying, layer by layer, a building material in powder form, wherein the device comprises a recoater that can be moved across a build area for applying a layer of the building material to the build area and a solidification device for selectively solidifying the applied layer at positions that correspond to a cross-section of the object to be produced, and the device is configured and/or controlled to repeat the steps of applying and selectively solidifying until the object is completed, wherein the recoating unit is movable across the build area in a first direction and at least a second direction different from the first direction such that the angle between the first direction and the second direction is between 15 and 210 degrees, the recoating unit comprising:
a first recoating blade and a second recoating blade spaced apart from each other in the first direction, the first recoating blade and the second recoating blade being configured to spread the building material to a uniform powder layer on the build area, the first recoating blade and the second recoating blade confining a receiving space for receiving the building material in powder form; and
a partition wall arranged in the receiving space between the first recoating blade and the second recoating blade and at a distance to the first recoating blade and the second recoating blade in the first direction and dividing the receiving space for the building material into a first chamber delimited by the first recoating blade and the partition wall and a second chamber delimited by the second recoating blade and the partition wall, the partition wall extending below the first and second recoating blades;
wherein, when the recoating unit moves in the first direction, the second recoating blade is a trailing recoating blade which is behind the first recoating blade and the recoating unit is configured to receive building material in the second chamber that is a trailing chamber in the first direction, and when the recoating unit moves in the second direction, the first recoating blade is the trailing recoating blade which is behind the second recoating blade and the recoating unit is configured to receive building material in the first chamber that is the trailing chamber in the second direction; and
wherein the recoating unit is configured to spread the building material received in the trailing chamber to a uniform layer by the trailing recoating element associated with the trailing chamber.

2. The recoating unit according to claim 1, wherein a fluidization device is arranged in and/or at one or more of the first and second recoating blades and/or the partition wall, the fluidization device configured to fluidize the building material received in one of the first and second chambers.

3. The recoating unit according to claim 1, the recoating unit comprising a guide plate pivotably arranged at the partition wall for guiding supplied building material to one of the first and second chambers.

4. The recoating unit according to claim 3, further comprising a shaft with an eccentric, the shaft being arranged so that the guide plate can be pivoted by rotating the shaft.

5. A device for producing a three dimensional object by selectively solidifying, layer by layer, a building material in powder form, the device comprising:
a recoater that can be moved across a build area in a first direction and/or a second direction opposite the first direction, for applying a layer of the building material to the build area; and
a solidification device for selectively solidifying the applied layer at positions that correspond to a cross-section of the object to be produced,
wherein the device is configured and/or controlled to repeat the steps of applying and selectively solidifying until the object is completed, and
wherein the recoater comprises a recoating unit according to claim 1.

6. A recoater for equipping and/or retrofitting a device for producing a three dimensional object by selectively solidifying, layer by layer, a building material in powder form, wherein the device is adapted to receive the recoater such that it can be moved across a build area for applying a layer of the building material to the build area, wherein the device comprises a solidification device for selectively solidifying the applied layer at positions that correspond to a cross-section of the object to be produced, and the device is configured and/or controlled to repeat the steps of applying and selectively solidifying until the object is completed,
wherein the recoater comprises a recoating unit according to claim 1.

7. The recoater according to claim 6, further comprising a powder discharge unit movable together with the recoating unit.

8. The recoater according to claim 7, further comprising:
a guide plate pivotably arranged at the partition wall of the recoating unit for guiding supplied building material to one of the first and second chambers of the recoating unit; and
a shaft with an eccentric, the shaft being arranged so that the guide plate can be pivoted by rotating the shaft,
wherein the shaft with the eccentric is at least partially coupled in its movement with a movement of a metering device of the powder discharge unit.

9. A recoating unit for equipping and/or retrofitting a device for producing a three-dimensional object by selectively solidifying, layer by layer, a building material in powder form, wherein the device comprises a recoater that can be moved across a build area for applying a layer of the building material to the build area and a solidification device for selectively solidifying the applied layer at positions that correspond to a cross-section of the object to be produced, and the device is configured and/or controlled to repeat the steps of applying and selectively solidifying until the object is completed, wherein the recoating unit comprises:
a first recoating blade and a second recoating blade spaced apart from the first recoating blade in a first direction of movement of the recoating unit, the first recoating blade and the second recoating blade each being configured to spread the building material to a uniform powder layer on the build area, the first recoating blade and the second recoating blade confining a receiving space for receiving the building material in powder form; and a partition wall that is arranged in the receiving space between the first recoating blade and the second recoating blade and dividing the receiving space for the building material into a first chamber delimited by the first recoating blade and the partition wall and a second chamber delimited by the second recoating blade and the partition wall, the partition wall extending below the first and second recoating blades, wherein, when the recoating unit moves in the first direction of movement, the first chamber is located ahead of the second chamber and the recoating unit receives building material in the second chamber that is a trailing chamber in the first direction of movement and spreads the building material received in the second chamber to a uniform layer by the second recoating blade that delimits the second chamber; and when the recoating unit reverses its direction to move in a second direction of movement opposite to the first direction of movement, the second chamber is located ahead of the first chamber and the recoating unit receives building material in the first chamber that is the trailing chamber in the second direction of movement and spreads the building material received in the first chamber to a uniform layer by the first recoating blade that delimits the first chamber.

\* \* \* \* \*